(12) United States Patent
Komiya et al.

(10) Patent No.: US 7,436,424 B2
(45) Date of Patent: Oct. 14, 2008

(54) LIGHT BEAM SCANNING APPARATUS AND IMAGE FORMING APPARATUS WITH PARALLEL MODULATING AND DRIVING CHANNELS

(75) Inventors: Kenichi Komiya, Kanagawa-Ken (JP); Koji Tanimoto, Shizuoka-Ken (JP); Daisuke Ishikawa, Shizuoka-Ken (JP); Yuji Inagawa, Shizuoka-Ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 241 days.

(21) Appl. No.: 11/092,888

(22) Filed: Mar. 29, 2005

(65) Prior Publication Data

US 2006/0227207 A1    Oct. 12, 2006

(51) Int. Cl.
   *B41J 2/47*    (2006.01)
(52) U.S. Cl. .................................. 347/239
(58) Field of Classification Search ............ 347/144, 347/234–240, 248–255, 247; 345/69; 358/1.9; 372/26
   See application file for complete search history.

(56) References Cited

U.S. PATENT DOCUMENTS

| | | | | |
|---|---|---|---|---|
| 5,754,303 | A * | 5/1998 | Ito et al. ................... | 358/1.9 |
| 5,764,664 | A * | 6/1998 | Yip et al. ................... | 372/26 |
| 6,184,916 | B1 * | 2/2001 | Cianciosi .................. | 347/255 |
| 6,326,993 | B1 * | 12/2001 | Satoh et al. ................ | 347/252 |
| 6,359,641 | B1 * | 3/2002 | Nacman et al. ............. | 347/235 |
| 6,882,329 | B2 * | 4/2005 | Isono et al. ................ | 345/69 |
| 6,950,118 | B2 * | 9/2005 | Cervantes .................. | 347/252 |
| 7,030,900 | B2 * | 4/2006 | Komiya et al. ............. | 347/239 |
| 2005/0007443 | A1 | 1/2005 | Komiya et al. | |
| 2005/0157159 | A1 | 7/2005 | Komiya et al. | |

FOREIGN PATENT DOCUMENTS

JP    2001-88344 A    4/2001
JP    2005-028871 A    2/2005

OTHER PUBLICATIONS

U.S. Appl. No. 11/063,544, filed Feb. 24, 2005, Ishikawa et al.
U.S. Appl. No. 11/091,933, filed Mar. 29, 2005, Ishikawa et al.

* cited by examiner

*Primary Examiner*—Hai C Pham
(74) *Attorney, Agent, or Firm*—Foley & Lardner LLP (57) ABSTRACT

An image forming apparatus includes a light generator (e.g., laser) generating a scanning light beam and a driver driving the light generator depending on a drive signal to be provided. In this apparatus, data formed of image information at each pixel of each line along a main scan direction of an image to be targeted are distributed into a plurality of strings (i.e., channels) of data (e.g., two strings). Concerning each pixel provided by data in each string, information indicative of both a start and an end of modulation (e.g., PWM) is then produced. By using the start and end information, a modulator performs modulation depending on the data of each pixel in each string, providing a modulated signal. The modulated signals from the plural strings are mutually synthesized at synchronizes timings, being provided as the drive signal and given to the driver.

8 Claims, 12 Drawing Sheets

LIGHT BEAM SCANNING APPARATUS AND IMAGE FORMING APPARATUS WITH PARALLEL MODULATING AND DRIVING CHANNELS

BACKGROUND OF THE INVENTION

1. Technical Filed of the Invention

The present invention relates to a light beam scanning apparatus generating a scanning light beam and an image forming apparatus, and in particular, to a light beam scanning apparatus in which sequential digital image data read from an object to be copied is distributed into a plurality of strings of data which are modulated based on image data string by string and the modulated results are synthesized to be used for control of the generation of laser light, and an image forming apparatus with this laser light scanning apparatus therein.

2. Related Art

Recently, a various types of imaging forming apparatuses, such as digital copying machines and laser printers, have been developed and are now already in practical use, in which exposure scanning that employs a laser light beam (hereinafter, simply called "light beams") is synthesized with an electrophotography process to form images.

This image forming apparatus is based on the principle that light beams are simultaneously scanned and exposed on and along a single photosensitive drum to form a single electrostatic latent image on the photosensitive drum and the electrostatic latent image is copied onto a sheet of paper.

In the field of the image forming apparatuses, especially in recent years, there has been a strong demand for forming images at higher speeds. In order to respond to this demand, a technique described in Japanese Patent Application No. 2004-168425 has been proposed. In this configuration, a single laser oscillator generating a scanning light beam is disposed and a plurality of transfer channels to the laser oscillator are formed to transfer image data thereto. Practically, a data processor is provided, in which image data supplied from a scanner section are subjected to predetermined image processing and digital image data of each line are distributed and outputted into two strings of image data (i.e., two systems (channels) of data): a string of image data at odd-number-th pixels (odd pixels) and a string of image data at even-number-th pixels (even pixels). This data processor further includes two serial circuits each having a PWM (pulse width modulator) and a laser driver, which process the image data composing each string. Both the laser drivers, each belonging to each data transfer channel, have output terminals electrically connected to the single laser oscillator via, for example, a wired logical add (OR) circuit.

However, in the case of the foregoing configuration, various drawbacks which must be removed have been pointed out. These drawbacks, which concern with the modulation function of the PWM, will now be detailed in connection with FIGS. 1 to 3.

The PWM has a function of making a pulse width and a pulse position for each pixel changeable. Changing the pulse width allows an image to be formed smaller than one pixel or a line to be formed finer. Further, changing the pulse position produces smooth oblique lines with less irregularity.

Figure 1:
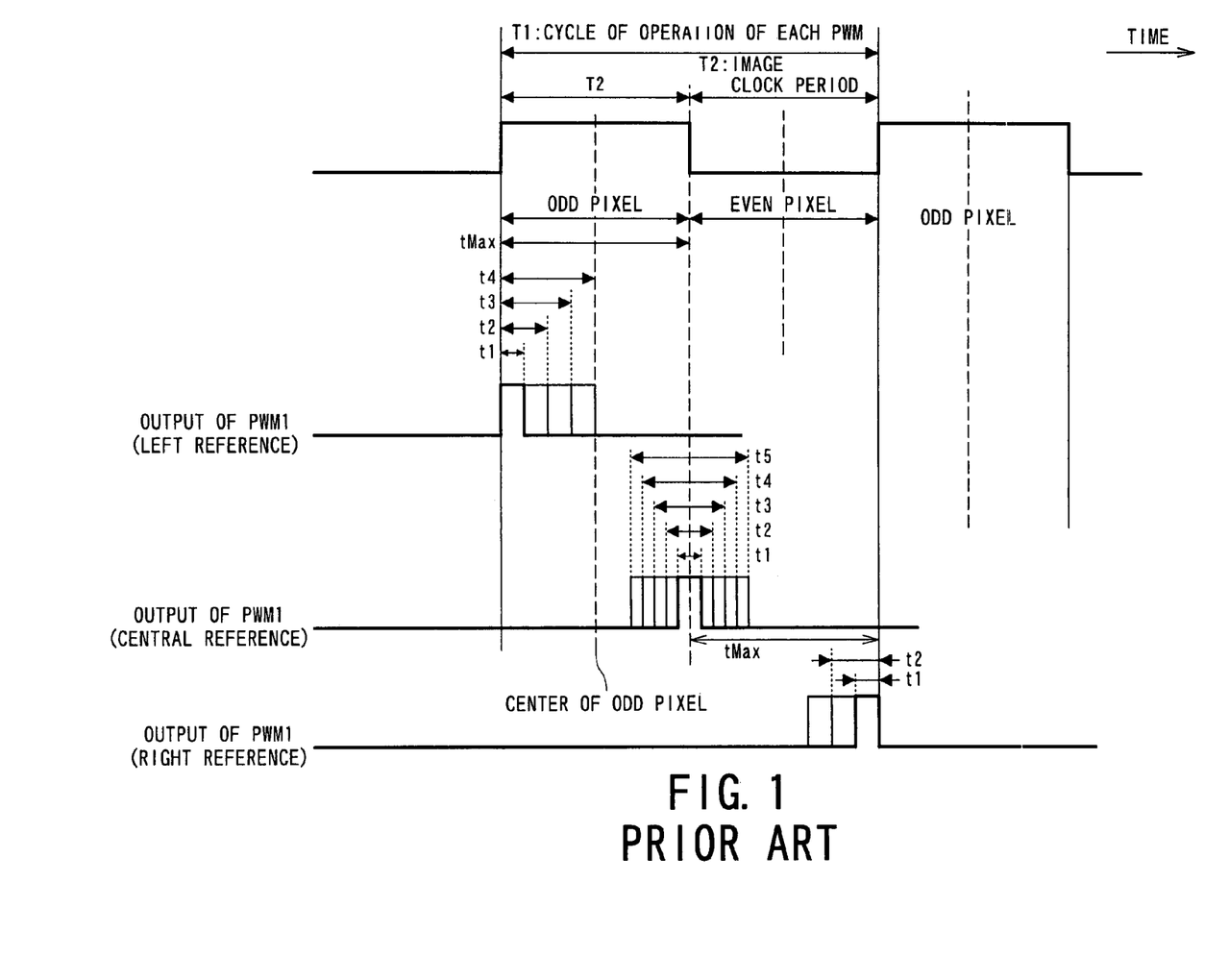
FIG. 1 is a timing chart explaining the relationship between a pulse start position and a pulse width, which exemplifies the prior art.

FIG. 1 shows how to change both the pulse width and the pulse position, which are processing to be performed together with the pulse with modulation at the PWM. Bits of information to change both the pulse width and the pulse position are given to the PWM as image data from a processor located on the upstream side of the PWM. The pulse position, which is not free to select, is selected from a left reference (front reference), right reference (rear reference), and central reference of one pixel.

Employing the left reference as the pulse position is to place the reference position at the front edge of each pixel. Hence, as a pulse width is made larger, the pulse extends toward the right side (i.e., toward the rear side) (refer to t1 to tMax in FIG. 1(A)). In contrast, employing the right reference as the pulse position is to place the reference position at the rear edge of each pixel. The pulse thus extends toward the left side (i.e., toward the front side), as the pulse width is made larger (that is, the rear edge of the pulse agrees to the rear end of each pixel: refer to t1 to tMax in FIG. 1(C)). When the central reference is employed as the pulse position, the pulse extends toward both sides thereof, with the center of the pulse made to agree to the center of each pixel (refer to t1 to t5 in FIG. 1(B)).

Assume that a modulation circuit is used, in which two PWMs (PWM1 and PWM2) are arranged in parallel and their outputs are synthesized with each other. In this modulation circuit, for producing images at faster speeds, the odd pixels are produced by the PWM1, while the even pixels are produced by the PWM2. The PWM1 for the odd pixels uses the left reference and/or the central reference in performing the pulse width modulation, but the PWM2 for the even pixels uses the central reference and/or the right reference in performing the pulse width modulation. In the pulse width modulation, each of the PWM1 and PWM2 operates on the reference clock T1, as shown in FIG. 1. However, the PWM1 and PWM2 are assigned to the production of the odd and even pixels, respectively, and their outputs are synthesized with each other.

Figure 2:
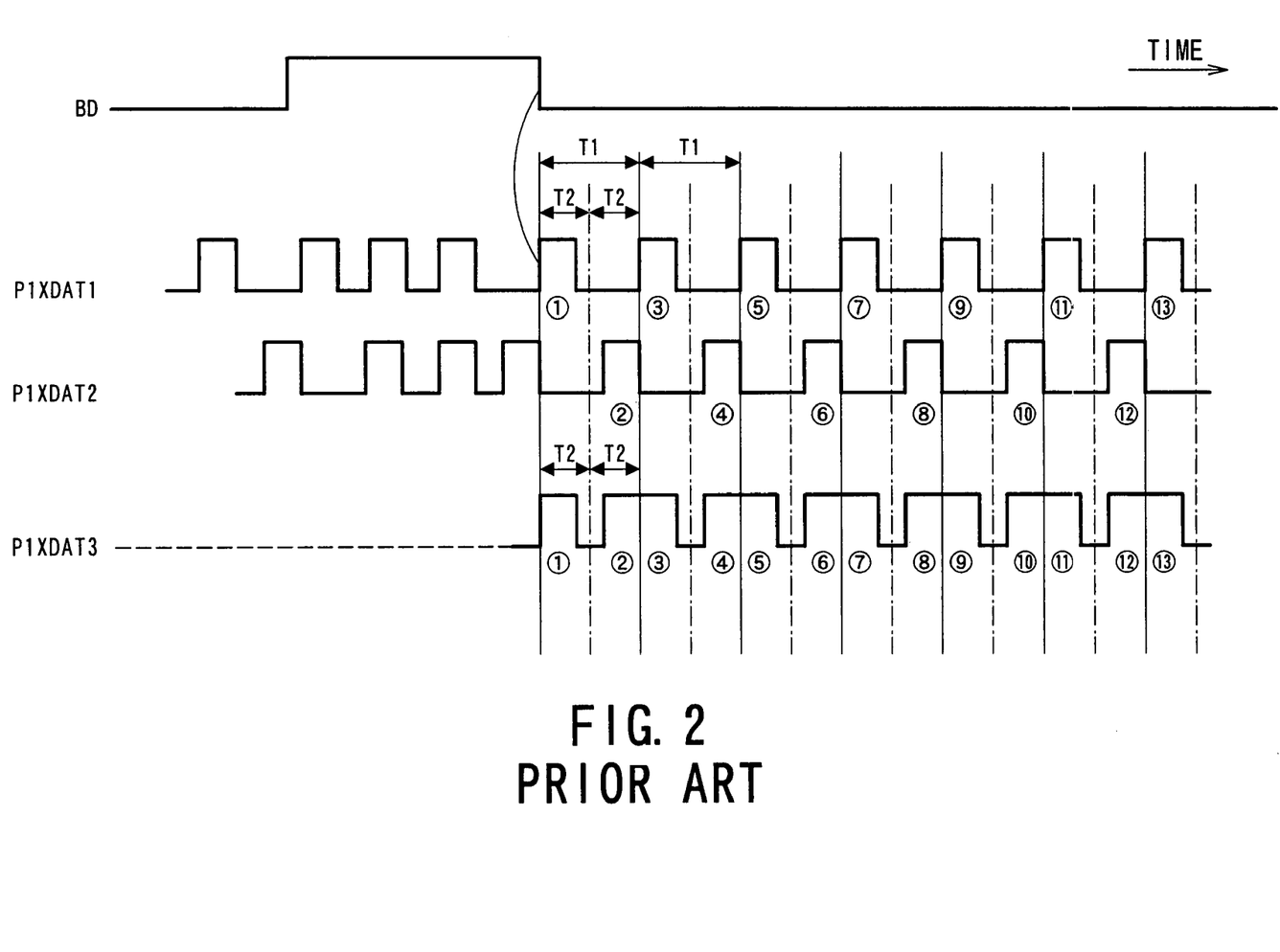
FIG. 2 is a timing chart showing waveforms for synthesis of two PWM outputs (modulated signals), which exemplifies the prior art.

How to synthesize the modulated outputs is shown in FIG. 2. In synchronism with a horizontal synthesizing signal BD, the modulated outputs (image data) of the PWM1 and the modulated outputs (image data) of the PWM2 are outputted as image data PIXDAT1 and PIXDAT2, respectively. Both the image data PIXDAT1 and PIXDAT2 are synthesized with each other to produce image data PIXDAT3. This image data IPIXDAT3 becomes a drive signal repeated at a high speed based on a cycle of T2 (=T1/2). This drive signal is outputted to the laser driver as a laser drive signal, with the result that the laser driver switches on/off the laser for scanning in a main scanning direction (the axial direction of the photosensitive direction) at the cycle of T2 in which the synthesized image data PIXDAT3 is reflected. Accordingly, the speed of the image formation is doubled.

However, in above configuration in which the plural PWMs are arranged in parallel, the following drawback has been pointed out.

The odd pixels are formed with the use of the left reference and/or the central reference assigned to the PWM1. That is, the position the right edge (rear edge) of each odd pixel is decided using the central reference to the PWM1, but the central reference will cause the pulse to extend toward both the sides thereof, with the central position of the pulse kept as a reference. Hence, as understood, there is caused a drawback that the pulse is obliged to run off the center and extend toward the neighboring even pixel. Meanwhile, the even pixels are formed by using the central reference and/or right reference assigned to the PWM2. Since the position of the left edge (front edge) of each even pixel is decided using the central reference to the PWM2, there is a problem that the pulse is obliged to run over the center and extend toward the neighboring off pixel.

Figure 3:
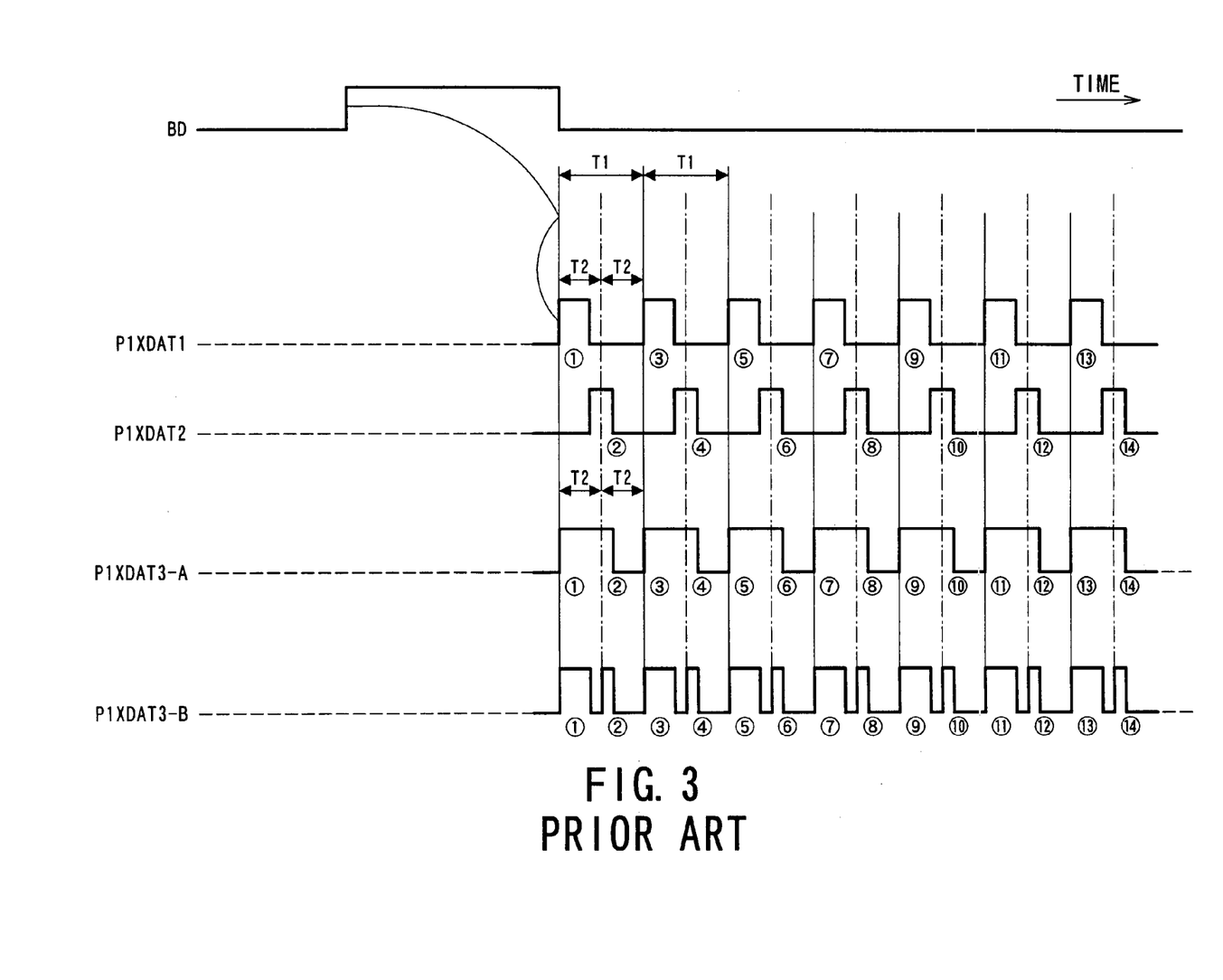
FIG. 3 is a timing chart showing waveforms (partly including a view explaining a desired synthesized state) for synthesis of two PWM outputs (modulated signals), which exemplifies the prior art.

FIG. 3 exemplifies pulses (image data PIXDAT2) based on the central reference to the PWM2 for producing the even pixels, in which the pulses are ran over toward the respective neighboring odd pixels. In this case, pulses (image data PIXDAT3-A) produced by synthesizing pulses (image data PIXDAT1) based on the left reference to the PWM1 and pulses (image data PIXDAT2) based on the central reference to the PWM2 loses the boundary between each odd pixel and each even pixel.

In this example, as illustrated by "PIXDAT-B," a desired synthesized pulse is found in a pulse train in which a pulse shown by encircled 1 and a pulse shown by encircled 2 are separated from each other. This separation will lead to printing, for example, a vertical line of ¾ pixel width, a blank of ¼ pixel width, and a vertical line of ¼ pixel width on sheets of paper.

However, the running over of the pulses (image data PIXDAT2) toward the odd pixels will cause a pulse train in which each pulse shown by the encircled 1 and each pulse shown by the encircled 2 are connected, with no separation therebetween. Hence repeating the scanning based on the pulse train shown by "PIXDAT-A" over a plurality of lines eliminates the blank of ¼ pixel width, which should originally be formed between the vertical line of ¾ pixel width and the vertical line of ¼ pixel width, whereby a vertical line of ⁵⁄₄ pixel width is printed.

SUMMERY OF THE INVENTION

In the apparatus and method according to the present invention, a plurality of modulator can be used to operate in parallel so that image formation is made faster, while images are formed with high quality.

According to the present invention, as one aspect, there is provided a light beam scanning apparatus comprising: a light generator generating a scanning light beam; a driver driving the light generator depending on a drive signal to be provided; a distribution circuit distributing data formed of image information at each pixel of each line along a main scan direction of an image to be targeted, into a plurality of channels of data consisting of a plurality of strings of data; a modulating-information producing circuit producing information indicating start and end of modulation for each pixel provided by each string of data distributed by the distribution circuit; a modulation circuit applying the modulation to the data at each pixel belonging to each string of data distributed, by using the start information and the end information produced by the modulating-information producing circuit, whereby a modulated signal is outputted string by string; a synchronization circuit mutually synchronizing the modulated signals from the plurality of strings of data outputted from the modulation circuit; and a synthesis circuit synthesizing the modulated signals from the plurality of strings of data so as to produce the drive signal, the modulated signals being mutually synchronized by the synchronization circuit.

As another aspect of the present invention, there is provided an image forming apparatus comprising: a light generator generating a scanning light beam; a driver driving the light generator depending on a drive signal to be provided; a distribution circuit distributing data formed of image information at each pixel of each line along a main scan direction of an image to be targeted, into a plurality of channels of data consisting of a plurality of strings of data; a modulating-information producing circuit producing information indicating start and end of modulation for each pixel provided by each string of data distributed by the distribution circuit; a modulation circuit applying the modulation to the data at each pixel belonging to each string of data distributed, by using the start information and the end information produced by the modulating-information producing circuit, whereby a modulated signal is outputted string by string; a synchronization circuit mutually synchronizing the modulated signals from the plurality of strings of data outputted from the modulation circuit; and a synthesis circuit synthesizing the modulated signals from the plurality of strings of data so as to produce the drive signal, the modulated signals being mutually synchronized by the synchronization circuit.

DETAILED DESCRIPTION OF PREFERRED EMBODIMENT

An embodiment of the present invention will now be described with reference to FIGS. 4 to 12. The present embodiment describes a light beam scanning apparatus according to the present invention and a digital copying machine serving as an image forming apparatus in which the scanning apparatus is arranged as part thereof. This digital copying machine may be reduced into practice as being a sole copying machine or part of an MFP (Multi-Functional Peripheral) system.

Figure 4:
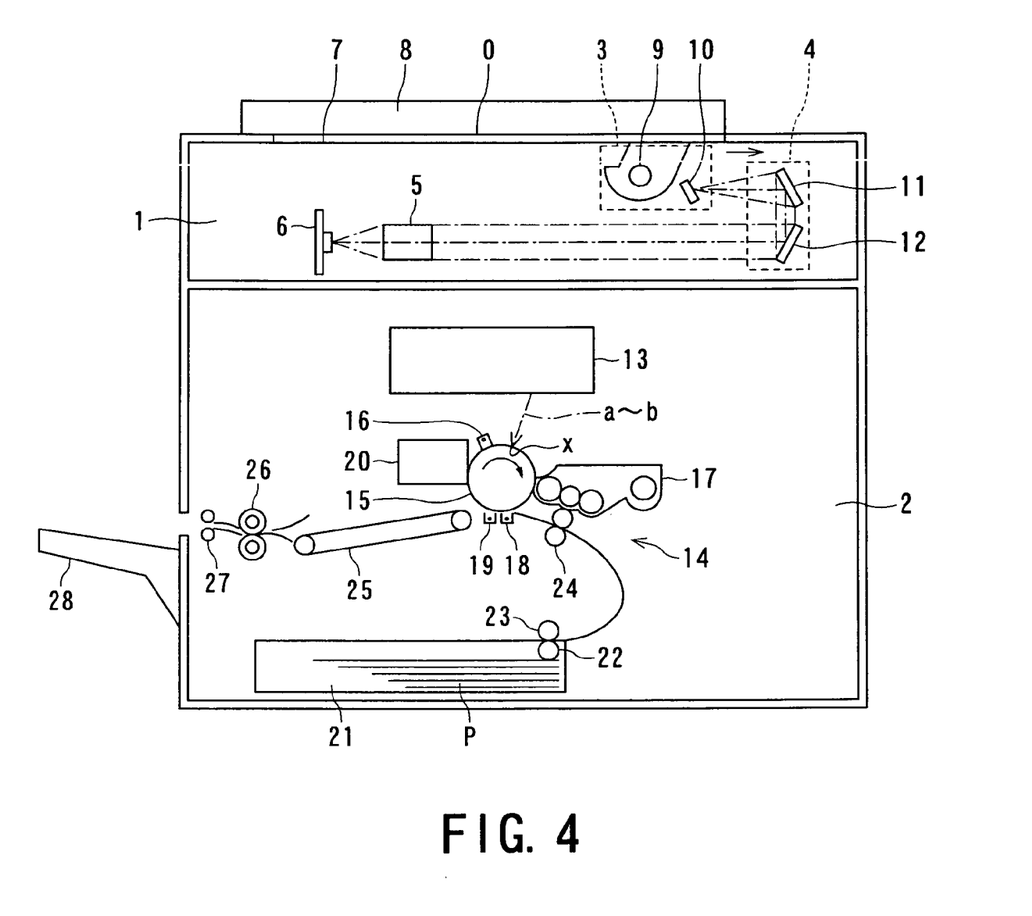
FIG. 4 is a view illustrating an outlined structure of a digital copying machine serving as an image forming apparatus according to an embodiment of the present invention.

FIG. 4 pictorially shows the structure of the digital copying machine according to the present embodiment. This digital copying machine is, for example, configured to have a scanner section 1 serving as image reading means, and a printer section 2 serving as image forming means. The scanner section 1 is composed of various components including a first carriage 3 and a second carriage 4, which are movable along an arrow in the figure, a focusing lens 5 and a photoelectric conversion element 6.

As illustrated in FIG. 4, an original is placed, with its face downward, on an original table 7 formed of transparent glass. In this case, a benchmark to place originals O is decided such that the frontal right side of the original table 7 in the minor direction thereof is a central benchmark. An original holding cover 8, which is open/close-operable by a user, holds the original O on the original table 7.

The original O on the table is illuminated by a light source 9. The reflected light from the original O is converged onto a light-receiving surface of the photoelectric conversion element via mirrors 10, 11 and 12 the focusing lens 5. The first carriage 3 with the light source 9 and mirror 10 disposed therein and the second carriage 4 with the mirrors 11 and 12 disposed therein are designed to move at a relative speed of 2:1 so as to keep the optical path length constant. Both of the first and second carriages 3 and 4 are driven by a carriage drive motor (not shown) in synchronism of a read timing signal to be provided, so that the carriages are moved from the right to the left in FIG. 4.

Images of the original O placed on the original table 7 are consecutively read line by line the scanner section 1. Resultant read-out outputs are then sent to an image processor 57 (refer to FIG. 6), where the outputs are converted to, for example, 8-bit digital image signals representing image densities.

The printer section 2 is equipped with an optical-system unit 13 and an image formation unit 14 being combined with the optical-system unit and operating on an electrophotography technique allowing images to be formed on a paper sheet P serving as a medium on which images are formed. Thus image signals from the original O, which responds to the read-out operations at the scanner section 1, are subjected to processing at the image processor 57 (refer to FIG. 3). The processed image signals are then converted to laser light beams (hereinafter referred to merely as "light beams") to be emitted from semiconductor laser oscillators (hereinafter referred to merely as "lasers") 31 (refer to FIG. 5). In the present embodiment, a single-beam system with one laser is adopted, but this is not a definitive list. The multi-beam system can also be realized by using plural lasers to be operative in parallel to each other.

Though a detailed description will be given later to the structure of the optical-system unit 13 in connection with FIG. 5, a single laser 31 is disposed in the unit 13. The laser 31 operates to emit light responsively to a laser modulation signal provided from a PWM 55B (refer to FIG. 6). The emitted light beam travels to arrive at a polygon mirror, by which the light beam is reflected to form a scanning light beam emitting out of the unit 13.

The light beam transmitted from the optical-system unit 13 is focused as a scanning light beam of a spot having a resolution necessary at an exposure location X (refer to FIG. 4) on a photosensitive drum 15 serving as an image carrying member. The scanning light beam is scanned to move its spot on the surface of the photosensitive drum 15, resulting in forming an electrostatic latent image on the photosensitive drum 15 depending on the read-out image signals.

As shown, around the photosensitive drum 15, there are provided a charger 16 for charging the surface of the drum 15, a developer 17, a transfer charger 18, a separating charger 19, a cleaner 20, and other members. The photosensitive drum 17 is driven by a drive motor (not shown) to rotate at a predetermined circumferential speed, during which rotation the drum is charged by the charger 16 positioned to face the surface to be scanned of the drum. The foregoing light beam (scanning light beam) is focused as a spot at the exposure location X on the charged photosensitive drum 15.

The resultant electrostatic latent image on the photosensitive drum 15 is then developed into a toner image with the aid of a toner (developing agent) supplied from the developer 17. At a transfer position, the toner image formed on the drum 15 is transferred by the transfer charger 18 onto a paper sheet P fed from a paper feed system on a timing-controlled basis.

The foregoing paper feed system is configured to feed paper sheets P to the image forming unit, one by one, in a separated manner realized by means of both a feed roller 22 and a separation roller 23. The paper sheets are contained in a paper feed cassette 21 located at a bottom portion of the apparatus. Each paper sheet from the paper feed cassette is fed to register rollers 24, in which the sheet is forced to reach a transfer position at a predetermined timing. On the downstream side of the transfer charger 18, arranged are a sheet convey mechanism 25, a fixing unit 26, and output rollers 27 outputting sheets P on which images are formed. Hence a paper sheet P with a toner image formed thereon is subjected to fixing at the fixing unit 26, before being delivered via the output rollers 27 onto a sheet output tray 28 secured on an outer side of the apparatus.

After completing the transfer of the image to the paper sheet P, the photosensitive drum 15 undergoes an operation at the cleaner 20, through which the residual toner on the drum surface is removed to return to its initial non-charge state. Hence the drum becomes ready for the next image formation.

Repeating the above processes makes it possible to perform image formation consecutively.

In this way, images of each original O placed on the original table 7 are read as image data by the scanner section 1, the resultant image data is subjected to the series of processes in the printer section 2, and recorded on a paper sheet P as a toner image.

The optical-system unit 13 will now be described.

Figure 5:
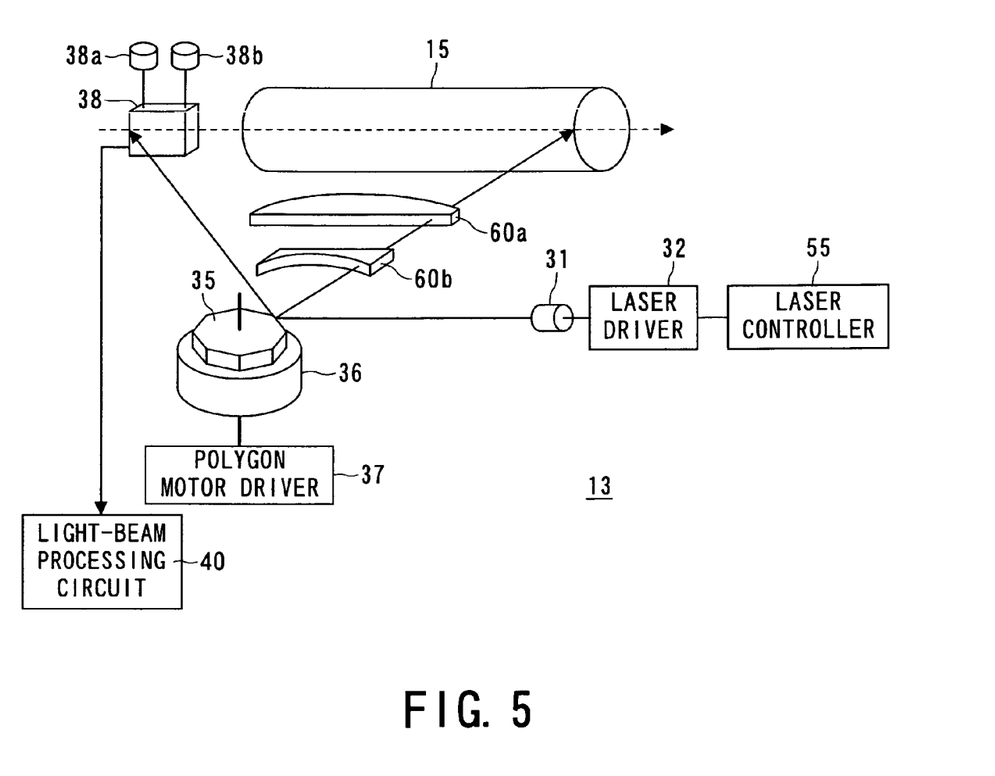
FIG. 5 is an outlined view explaining the configuration of an optical system of the digital copying machine according to the embodiment.

FIG. 5 shows the configurations of the optical-system unit 13 and a positional relationship of the photosensitive drum 15 with the unit 13. As described, the optical-system unit 13 is provided with, by way of example, the single laser (semiconductor laser oscillators) 31 serving as light-beam generating means. This laser 31 is driven to form images along individual scanning lines. That is, the laser 31 is driven by the laser driver 32, and the light beam emitted by the laser 31 passes a collimating lens (not shown), before entering the polygon mirror 35 that is a multi-surface rotation mirror.

The polygon mirror 35 is driven to rotate at a constant speed, in which a polygon motor 36, which receives a drive signal from a polygon motor driver 37, performs the rotation of the polygon mirror 35. This allows the emitted light beams from the polygon mirror 35 to be scanned along a predetermined direction at an angular speed defined by the number of rotations of the polygon motor 36. The light beams to be scanned by the polygon mirror 35 are given a f-θ characteristic of a not-shown f-θ lens through which the beams are traveled. Hence the f-θ lens enables scanning of the beams along scanning lines each running on both a light-receiving surface of the light-beam detector 38 and the surface of the photosensitive drum 15 at the constant speed. The light beam detector 38 thus functions as light-beam passage timing detecting means.

In addition, the laser driver 32 is provided an auto-power control (APC) circuit, in which the laser 31 is controlled to emit light under the same power condition at any time. In other words, a comparison is made between a detected output from a light-amount sensor (i.e., PD: photodiodes) incorporated in the laser oscillator and an emission power level instructed by a main controller (including a CPU) (refer to FIG. 6) and the emission control is carried out to keep these amounts equal to each other.

The light beam detector 38 is equipped with adjusting motors 38a and 38b to be used for adjusting the installation position of the detector and a tilt of the light beams in the scanning direction.

The light beam detector 38 is used, as described above, to detect passage positions, passage timings, and power (amounts of light) of the foregoing light beam to scan the photosensitive drum 15. The light beam detector 38 is disposed close to an end of the photosensitive drum 15 so that the light-receiving surface of the light beam detector 38 positionally agrees with the surface of the photosensitive drum 15. Signals detected by this light beam detector 38 are used to control both of the laser 31 and the light emission timing (corresponding to positional control of images to be formed in the main scan direction). The sensed signals outputted by the light beam detector 38 further include a signal representing a horizontal synchronization realized using the function of sensing the passage position of the light beam.

To produce the signals for these kinds of control, the light beam detector 38 is communicably connected to the light-beam processing circuit 40. Hence, responsively to the various detected signals from light beam detector 38, the light-beam processing circuit 40 is able to provide both of the main controller 51 and a later-described laser controller 55 (refer to FIG. 6) with pulse signals (including a horizontally synchronizing signal BD) in which the passage position and the passage timing of the light beam are reflected.

The control system will now be described.

Figure 6:
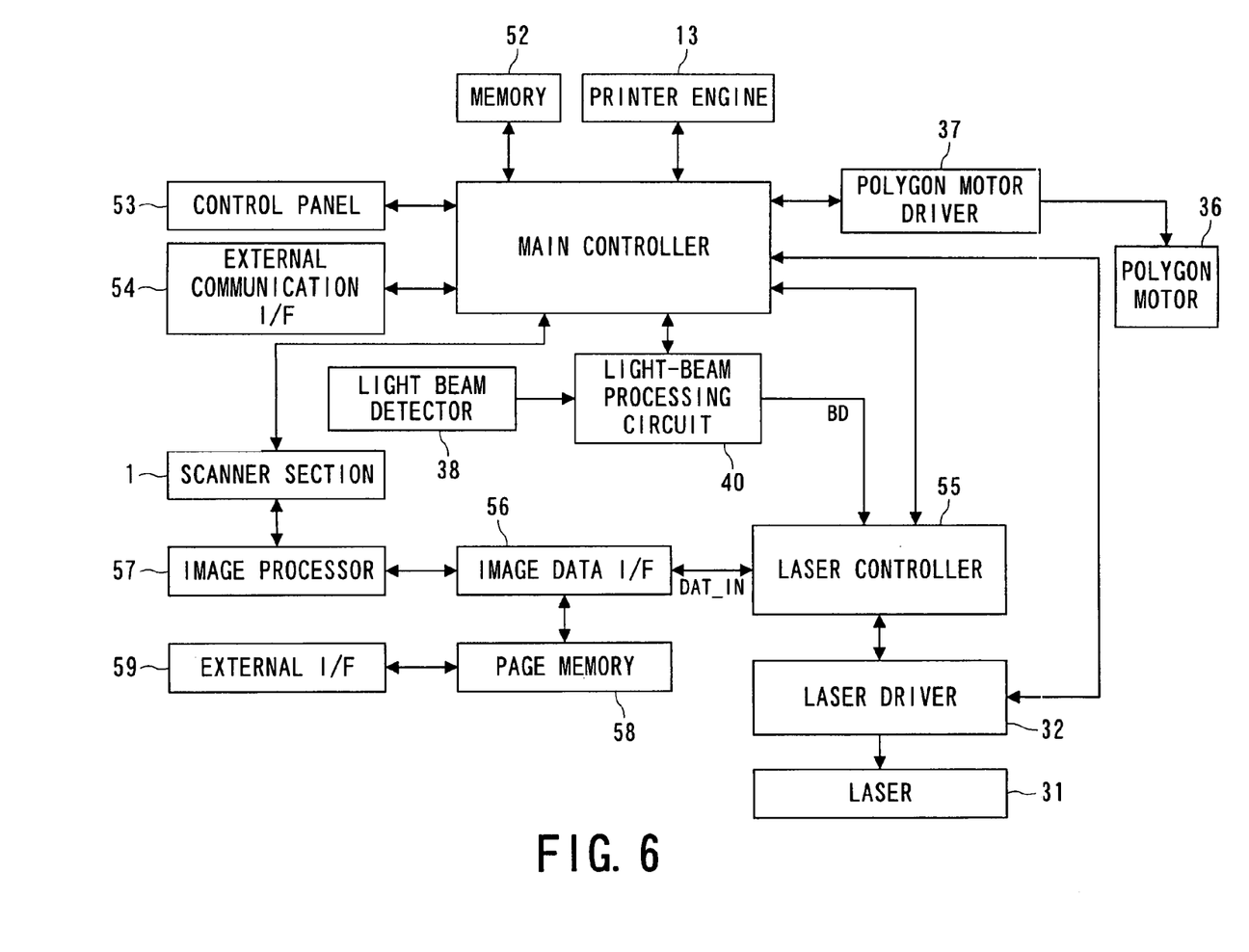
FIG. 6 is a block diagram explaining an outlined configuration of a control system of the digital copying machine according to the embodiment.

FIG. 6 exemplifies a control system coping with an optical system based on the single-beam technique. This control system is provided with the main controller 51 listed before, which is assigned to an electrical control of the apparatus. By way of example, the main controller 51 is structured to have, though not shown in the figure, a CPU (central processing unit), memories, a clock circuit and others. Further, various components are electrically connected to this main controller 51 for mutual communication therebetween, such components including a memory 52 placed outside the controller, a control panel 53, an external communication interface (I/F) 54, the laser driver 32, the polygon-mirror motor driver 37, the light-beam processing circuit 40, the scanner section 1, and the laser controller 55.

Of these, the laser controller 55 is electrically connected to both the light-beam processing circuit 40 and the image data interface (I/F) 56, as shown in FIG. 6, as well as the main controller 51. An image processor 57 is arranged to electrically be connected to the laser controller 55 through an image data interface 56, whereby image data can be outputted to the laser controller 55. In addition, to the image data interface 56 is connected to an external interface (I/F) 59 via a page memory 58.

When a copying action is performed, images of an original O placed on the original table 7 are read by the scanner section 1, and then the read-out image data is sent to the image processor 57. In the image processor 57, the image data from the scanner section 1 undergoes various types of known data processes, such as shading correction, a variety of types of filtering, gradation processing, and gamma correction. The digital image data "DAT_IN" which has experienced such processes is then sent to the image data interface 56.

This image data interface 56 is given various functions such as data buffering, which relays the image data "DAT_IN" outputted from the image processor 57 to the laser controller 55.

Figure 7:
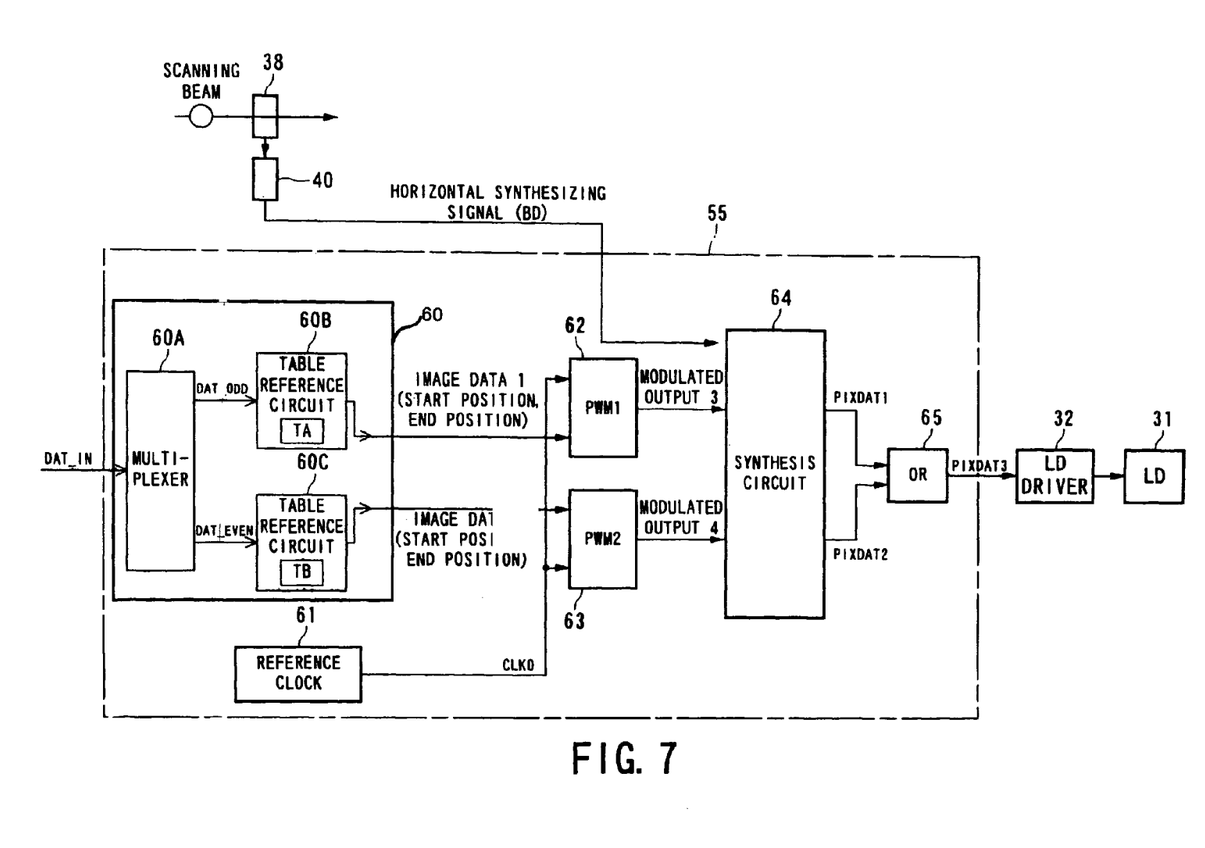
FIG. 7 is a block diagram outlining the configuration of a laser controller belonging to the control system.

As shown in FIG. 7, the laser controller 55 is provided with a data processing section 60 at its input stage. The data processing section 60 includes a multiplexer 60A functioning as data distributing means and data reference circuits 60B and 60C. Of these components, the multiplexer 60A receives the image data "DAT_IN" and distributed the received image data alternatively, pixel by pixel, so as to produce two strings of image data (i.e., two systems (channels) of data), which are a string of image data "DAT_ODD" consisting of odd pixels and a string of image data "DAT_EVEN" consisting of even pixels. The string "DAT_ODD" of image data at the odd pixels are outputted to one table reference circuits 60B, while the string "DAT_EVEN" of image data at the even pixels are outputted to one table reference circuits 60C.

The table reference circuits 60B and 60C have conversion tables TA and TB, respectively, which are made reference to convert the digital image data "DAT_ODD" and "DAT_EVEN" at the odd and even pixels into information indicating a start position and an end position of each pulse for producing each pixel image. Hence one of the table reference circuits, 60B, refers the image data "DAT_ODD" at each odd pixel to the conversion table TA to obtain information indicating a start position and an end position of a pulse modulated on image data at this pixel, and then outputs the obtained information to the next laser controller 55 as image data 1. In the similar manner to this, the other table reference circuit 60C refers the image data "DAT_EVEN" at each even pixel to the conversion table TB to obtain information indicating a start position and an end position of a pulse modulated on image data at this pixel, and then outputs the obtained information to the next laser controller 55 as image data 2.

The laser controller 55 further comprises, as shown in FIG. 7, a reference clock circuit 61, an odd-pixel-string PWM 62, an even-pixel-string PWM 63, a synchronization circuit 64, and a logical add (OR) circuit 65.

The reference clock circuit 61 outputs, for example, a reference clock "1/16" that corresponds a minimum division unit (for example, 16-division) on which one pixel is divided. This reference clock may also be produced by dividing a system clock.

Each of the PWMs 62 and 63 receives the inputted image data 1 or 2 and modulates a pulse based on the image data 1 or 2 to produce a modulated output 3 or 4 based on pulse width modulation (i.e., modulated pulse signal).

Figure 8:
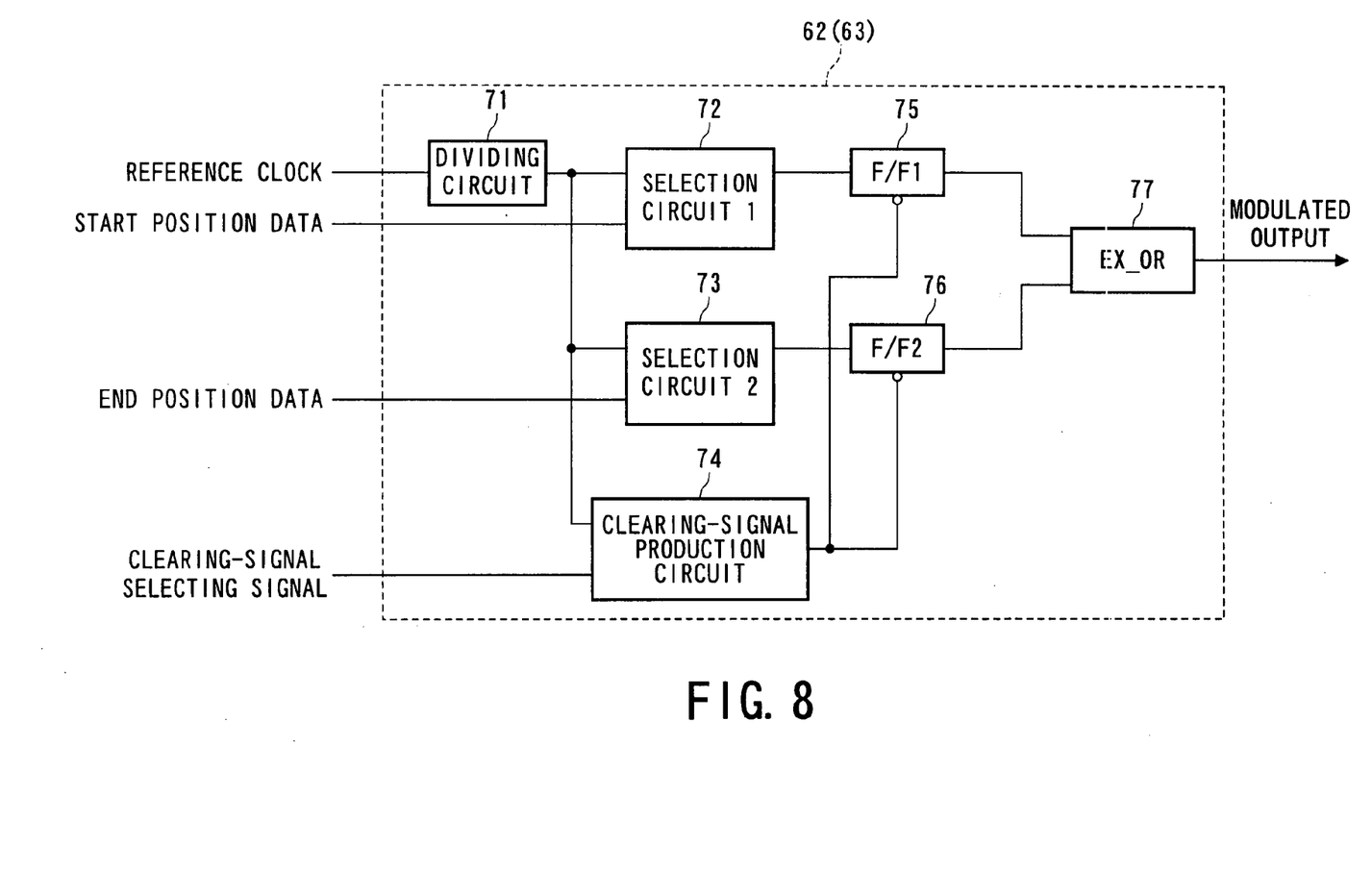
FIG. 8 is a block diagram outlining the configuration of each PWM belonging to the laser controller.
Figure 9:
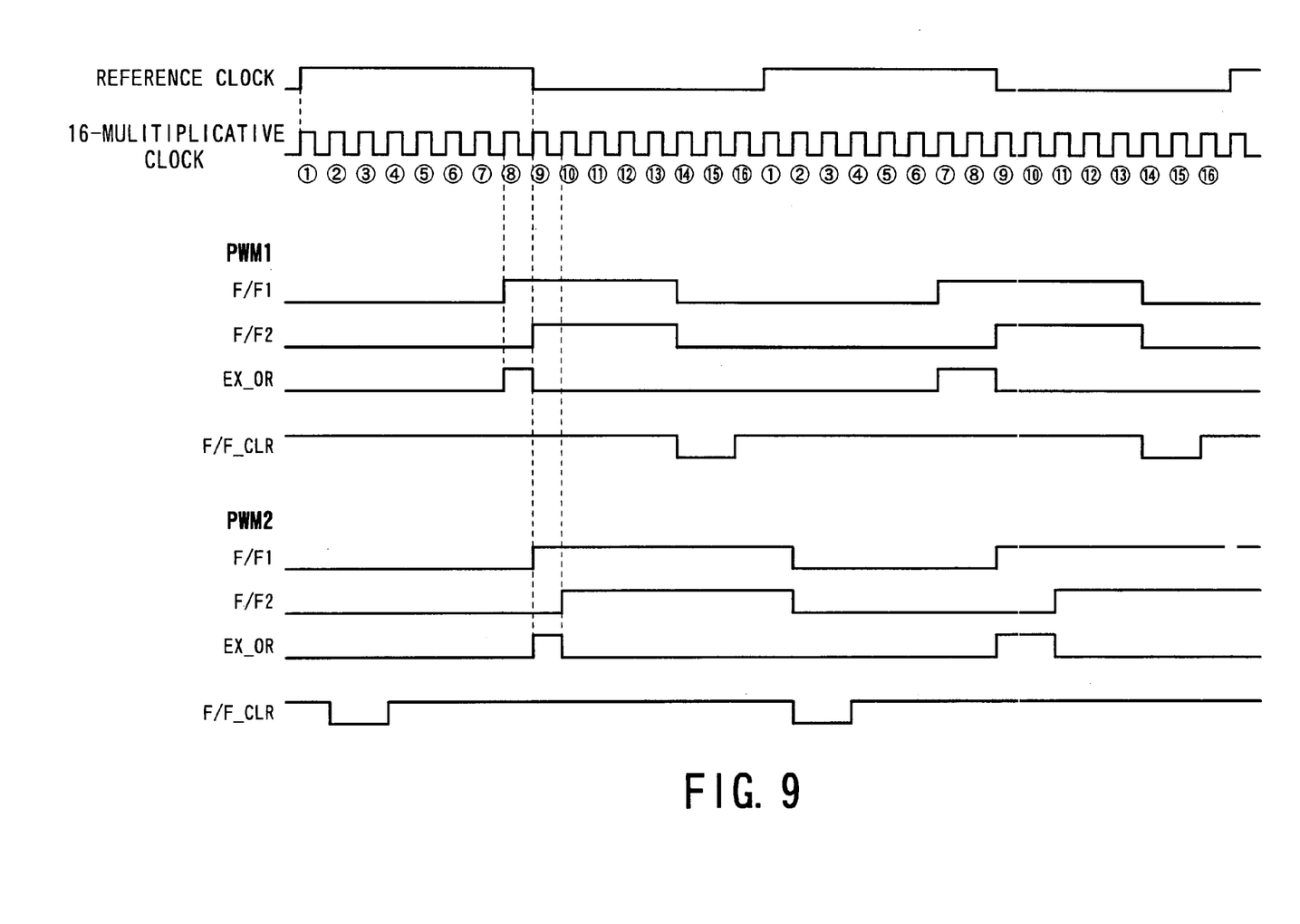
FIG. 9 is a timing chart outlining the operations of each PWM.

Specifically, each of the PWMs 62 and 63 is structured to have a logic circuit shown in FIG. 8 and to operate based on pulse width modulation shown in FIG. 9. Each PWM 62 (63) is provided with a dividing circuit 71, selection circuits 72 and 73, clearing-signal production circuit 74, flip-flop (F/F) circuits 75 and 76, and an exclusive logical add (EX_OR) circuit 77. The dividing circuit 71 receives a reference clock signal and divides it (for example, divided into 1/16) to provide the divided clock signal to the selection circuits 72 and 73 and the clearing-signal production circuit 74, respectively. Of the two selection circuits 72 and 73, data indicative of the pulse start position for each pixel is given to the selection circuit 72 and data indicative of the pulse end position for each pixel is given to the remaining selection circuit 73. On the output sides of the selection circuits 72 and 73, the flip-flop circuits 75 and 76 are located respectively, whilst the output terminals of the flip-flop circuits 75 and 76 are electrically connected with the nest-stage synchronization circuit 64 via the exclusive logical add circuit 77. In addition, the clearing-signal selecting signal is sent to the clearing-signal production circuit 74, where a clearing signal to the flip-flop circuits 75 and 76 is produced.

When one of the selection circuit, 72, selects data of the start position of a pulse in synchronism with the divided clock signal, one of the flip-flop circuit, 75, rises, while when the other selection circuit 73 selects data of the end position of the pulse in synchronism with the divided clock signal, the other flip-flop circuit 76 rises. Thus, as shown in FIG. 9, each of the PWMs 62 and 63 produces a pulse that rises up in accordance with the pulse start position data that was instructed and falls in accordance with the pulse end position data that was instructed. The resolution of those rising and falling operations depends on the frequency of on the divided clock signal. Both the flip-flop circuits 75 and 76 are cleared by a clear signal (FF_CLR).

In this way, the PWM 62 produces the modulated signal 3 (pulsed signal) subjected to the pulse width modulation based on the image data 1 at each odd pixel (i.e., data indicative of the pulse start position and the pulse end position defining each pixel), and provides it to the next synchronization circuit 64. In the similar manner to this, the other PWM 63 produces the modulated signal 4 (pulsed signal) subjected to the pulse width modulation based on the image data 2 at each even pixel (i.e., data indicative of the pulse start position and the pulse end position defining each pixel), and provides it to the next synchronization circuit 64.

The synchronization circuit 64 receives the horizontally synthesizing signal BD provided from the light-beam processing circuit 40 as well as both the modulated outputs 3 and 4, and synchronizes both the modulated outputs 3 and 4 with the horizontally synthesizing signal BD. The synchronized signals are outputted as pulse signals PIXDAT1 and PIXDAT2 from the synchronization circuit 64. Practically, the pulse signal PIXDAT1 for an odd pixel and the pulse signal PIXDAT2 for the next even pixel are synchronized with each other, and those signals are sent to the next logical add circuit 65.

The logical add circuit 65 applies a synthesis operation to both the inputted pulse signals PIXDAT1 and PIXDAT2 so as to produce a pulse signal PIXDAT3 to be transferred to the driver 32 as a drive signal therefore. The driver 32 sequentially receives, as the drive signal, the pulse signal PIXDAT3 made of a pair of pulses for the odd and even pixels, so that the laser 31 is driven on the drive signal in an on/off manner.

Returning to the explanation in connection with FIG. 6, the control panel 63 is a man-machine interface by which an operator can give the apparatus a command for activating copying actions, a command for setting the number of sheets of paper, and others.

In the case of the present digital copying machine, the actions carried out therein will not be limited to the copying actions. Since externally produced image data can enter this machine via the external interface 59 connected to the page memory 58, such image data can be formed and outputted in and from this machine. The image data received through the external interface 59 is temporarily stored in the page memory 58, and then sent to the laser controller 55 via the image data interface 56.

In cases where the instant digital copying machine is controlled by external commands to be transmitted through, for example, a network, the external communication interface 54 will realize the functions of the control panel 53.

The polygon motor driver 37 is a member driving the polygon motor 36, which causes the polygon mirror 35 to rotate to scan the foregoing light beam. The main controller 51 commands this polygon motor driver 37 to start and stop the rotation and control the number or rotations. This rotational number control is carried out, according to needs (for instance, a standby mode of the apparatus), when it is determined that the number of rotations should be reduced less than a predetermined number of rotations.

Other than the operations for emitting a laser beam in response to a modulated signal which is synchronous to the light beam scanning in the scanner section 1 and which comes from the foregoing laser controller 55, the laser driver 32 has a function of causing the laser oscillator 31 to forcibly emit light in answer to a forcible light-emitting signal from the main controller 51. This light emission is commanded independently of the image data to be received.

The main controller 51 is able to specify amounts of power of light to be emitted by the laser 31 and to give the amounts of light to the laser driver 32. In the main controller 51, the amounts of power are specified depending on changes in process conditions and others.

The memory 52 memorizes bits of information necessary for the control.

The operations and advantages of this digital copying machine according to the present embodiment will now be described. Since the whole operations of this machine have already been outlined, this section will focus on describing the operations and advantages performed and obtained by the laser controller 55 in connection with FIGS. 10 to 12.

Figure 10:
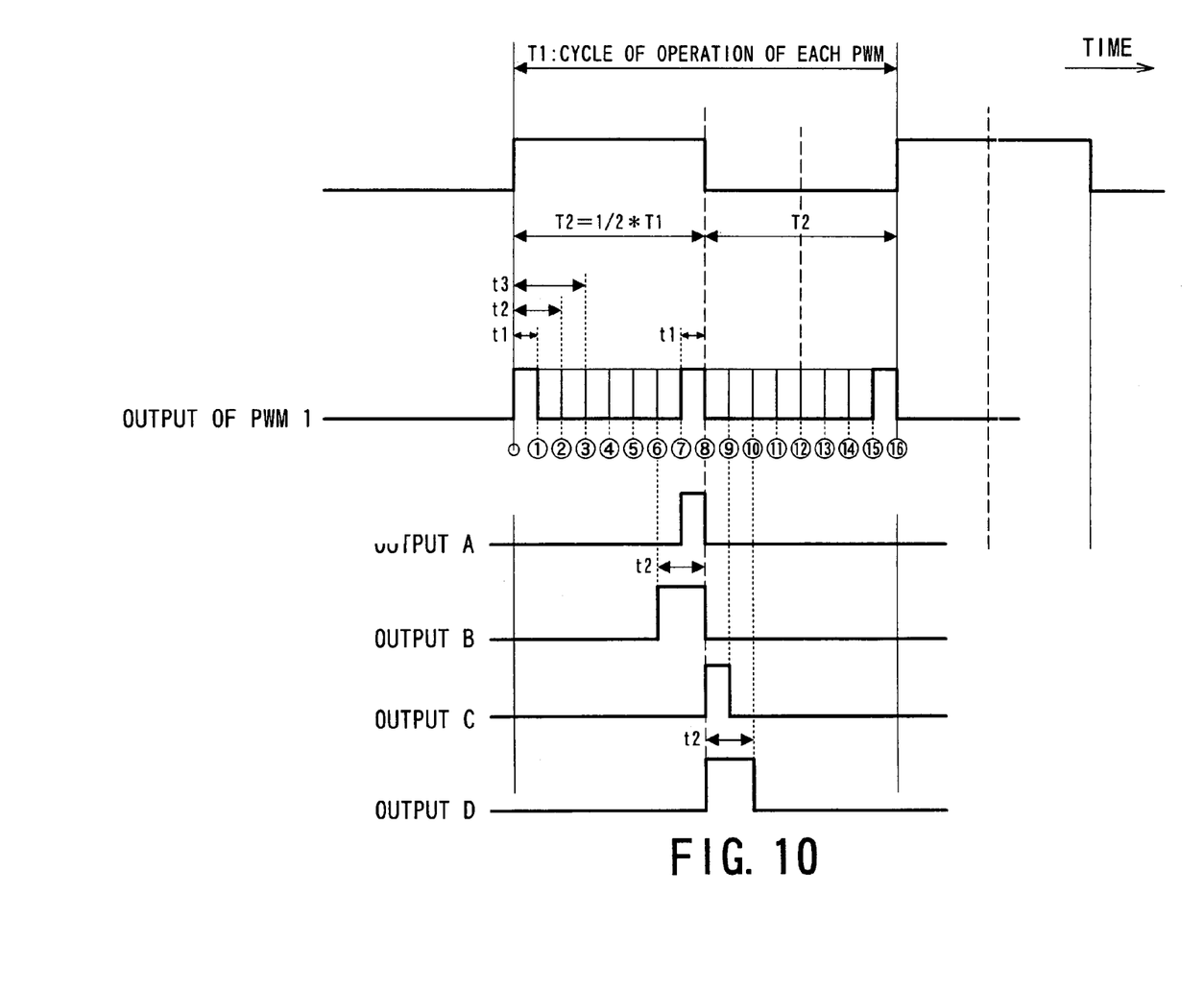
FIG. 10 is a timing chart explaining both the start position and the end position of a pulse to be used for pulse width modulation according to one example in which the structure of the present invention is reduced into practice.

FIG. 10 exemplifies the outputs of the respective PWMs 62 and 63, which are obtained in the operations of the laser controller 55 to which the present invention is applied. How the PWMs 62 and 63 produce their outputs will now be outlined in the following. In the conventional, the PWM output has been specified by both of a pulse potion (i.e., the left reference, central reference, and right reference) and a pulse width, but this technique will not be employed in the present embodiment. That is, in place of such a technique, the present invention employs a technique of defining a combination of a pulse start position and a pulse end position within the pixel, pixel by pixel, in which the combination of such positions specifies pulse-modulating information.

An example will now be given, wherein one pixel is divided to a size of ⅛ for depiction. Specifically, a pulse minimum width t1 is t1=(1/16)×T1, where T1 is a cycle of operation of each PWM, as shown in FIG. 10.

Now assume that the foregoing data processing section 60 provides one of the PWMs, 62 (63), with image data 1 (2) composed of outputs A to D, which are as follows.

Output A (start position, end position)=(<7>, <8>)

Output B (start position, end position)=(<6>, <8>)

Output C (start position, end position)=(<8>, <9>)

Output D (start position, end position)=<8>, <10>)

In these outputs, the numbers with parentheses (in the drawing, those numbers are encircled) show temporal positions (timings) decided by dividing one pixel by 8, that is, 16-divisions of the operation cycle T1 of each PWM.

For example, when the output A is given to the PWM 62 (63), the output of one of the selection circuits, 72, in the PWM 62 (63) turns on at the timing of <7>, which causes the flip-flop circuit 75 to be made on. And the output of the other selection circuit 73 turns on at the timing <8>, which causes the other flip-flop circuit 76 to be made on. In consequence, the exclusive logical add circuit 77 outputs a pulse which is made ON during only one division of <7> to <8>. Thus as shown in FIG. 10, a pulse to be outputted, that is, a modulated pulse 3 (4) which has been subjected to the PWM modulation, results in providing a modulated pulse whose width is (1/16)× T1 and which starts at the timing of <7>.

Similarly to the above, when the output B is given to the PWM 62 (63), the output of one of the selection circuits, 72, in the PWM 62 (63) turns on at the timing of <6>, which causes the flip-flop circuit 75 to be made on. And the output of the other selection circuit 73 turns on at the timing <8>, which causes the other flip-flop circuit 76 to be made on. In consequence, the exclusive logical add circuit 77 outputs a pulse which is switched "on" during two divisions of <6> to <8>. Thus as shown in FIG. 10, a pulse to be outputted, that is, a modulated pulse 3 (4) which has been subjected to the PWM modulation, results in providing a modulated pulse whose width is (2/16)×T1 and which starts at the timing of <6>.

In the similar manner to the above, when the output C is given to the PWM 62 (63), the modulation results in a modulated pulse which rises at a divided timing of <8> and lasts during a width of (1/16)×T1, as shown in FIG. 10. Further, for the output D, as shown in shown in FIG. 10, the modulation results in a modulated pulse which rises at a divided timing of <8> and lasts during a width of (2/16)×T1.

In this way, for each pixel, a PWM modulated signal is provided in response to specified start position and end position of a pulse to be modulated within the pixel. The PWM modulated signals produced by the two-system PWMs 62 and 63 are mutually synthesized with synchronization therebetween, thus being used for driving the one laser 31.

Figure 11:
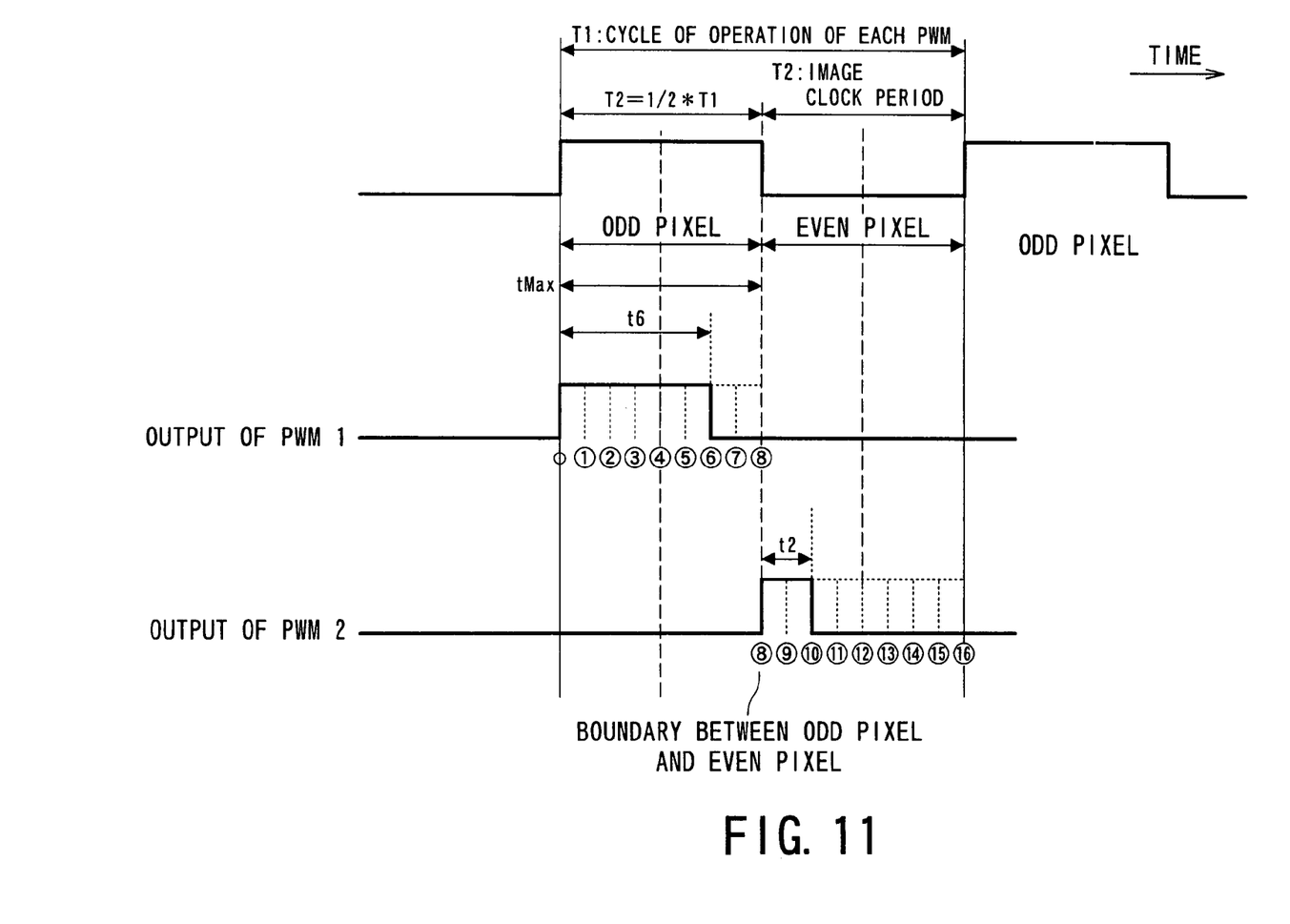
FIG. 11 is a timing chart of pulse waveforms showing pulse width modulation according to one example in which the structure of the present invention is reduced into practice.

FIG. 11 exemplifies the production of modulated signals for odd pixels and even pixels, which are based on the foregoing pulse width modulation. In the figure, "output of PWM1" exemplifies the output of the PWM 62 which performs the modulation for an odd pixel, while "output of PWM2" exemplifies the output of the PWM 63 which performs the modulation for the even pixel which is the next to the odd pixel. The former exemplifies the modulated signal obtained by receiving timings of 0 to <6> as the start and end positions of a pulse. In contrast, the latter exemplifies the modulated signal obtained by receiving timings of <8> to <10> as the start and end positions of a pulse. That is, these examples show the modulated signals to be produced responsively to:

"for odd pixel: (start position, end position)=(0, <6>) are received for a pulse width=(6/16)×T1" and "for even pixel: (start position, end position)=(<8>, <10>) are received for a pulse width=(2/16)×T1."

Figure 12:
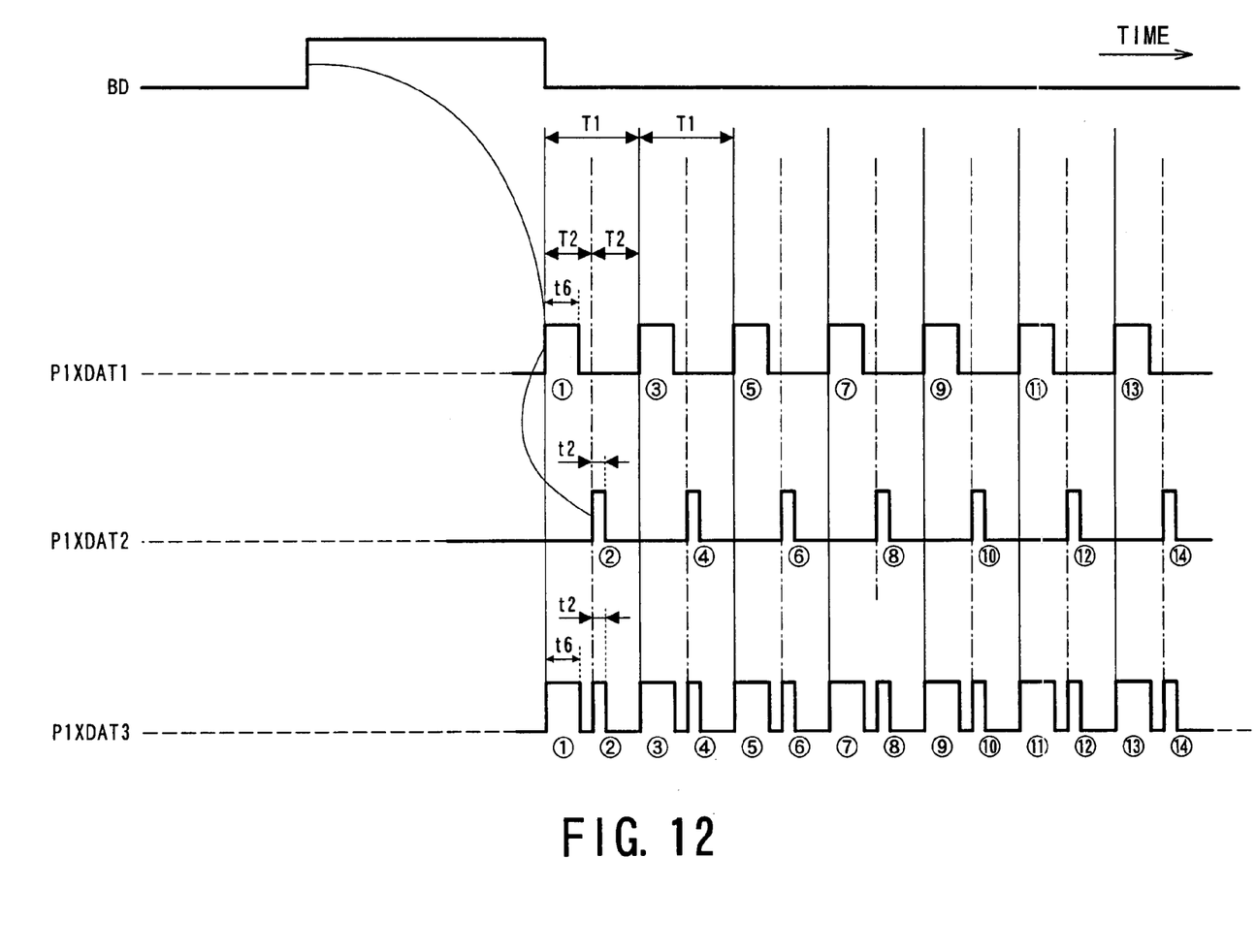
FIG. 12 is a timing chart of waveforms showing synthesis of modulated signals for both of odd pixels and even pixels, which is according to one example in which the structure of the present invention is reduced into practice.

In FIG. 12, the outputs of the synchronization circuit 64 and the OR circuit 65 are exemplified in the form of pulse sequences, which are resultant from the modulated signals shown in FIG. 11. The pulse sequences shown in FIG. 12 correspond to those shown in FIG. 3, which has been the operations based on the prior technique, as explained before. As can be understood from FIG. 12, the synthesized modulated signal outputted from the OR circuit 65 provides a period of non-pulse of "2/16" between a pulse <1> for an odd pulse and the next even pulse <2> (refer to the output PIXDAT3 shown at the bottom, which corresponds to the output PIXDAT3-B shown at the bottom in FIG. 3). In other words, there is no continuation between the pulses <1> and <2> for both the odd and even pixels mutually juxtaposed.

Accordingly, in the present embodiment, unlike the prior technique, the modulation has no limitations from pulse positions (that is, the modulation will not undergo the limitations of the left reference, central reference, and right reference). As one example, as described above, there can be provided a modulated signal that is subjected to the pulse width modulation having an arbitrary width from any temporal position (timing), where the arbitrary width is defined by "minimum-unit width×an integer selected from 1 to 8," the minimum unit being defined as a pixel unit of 1/16 of the operation cycle of each PWM.

As a result, the drawbacks, such as distortions of vertical lines and loss of fineness of thin lines, which may have caused at boundaries between mutually juxtaposed pixels, as described, can be removed surely, whereby deterioration in image quality can be improved.

That is, the drawback that a pulse based on the central reference runs off so as to extend over the neighboring pixel can be avoided with steadiness. While such an advantage is obtained, the single laser can be used for forming images at higher speeds, in which the scanned pixels are distributed into two strings of odd pixels and even pixels so that the modulated signals on the pulse width modulation are apparently produced at a doubled speed. This largely contributes to satisfying the requirements of "faster printing" and "finer resolution" which are for recent image forming apparatuses.

In addition, in the present embodiment, the circuits placed on the upstream side of the PWMs produce the start and end information indicating pulse positions and provide it to the PWMs. This eliminates the need for arranging a circuit for masking the run-off of a central-reference-basis pulse toward the neighboring pixel in pulse-width-modulating in the PWM circuits. Such a masking circuit is usually complicated in it is circuitry, and manufacturing such a masking circuit is costly. Thus the advantage of preventing the run-off of pixels, which is provided in the present embodiment, is considerably effective.

Further, in application of the present invention, the processing in the image processor 57 is similar to the conventional, thus system changes in the apparatus being limited to smaller amounts.

Incidentally, the present invention is not limited to the configurations descried in the above embodiments, but can further be reduced into practice in various modes derived from combinations with known art, by the person skilled in the art, without departing from the gist of the present invention claimed.

For example, the present invention can be applied to the multi-beam technique. Furthermore, the number of strings (channels) to which the sequential image data of each line to be scanned are distributed is three or more, not limited to the two strings. In the case of the three strings, the sequential image data are distributed in the order of odd, even, and odd pixels, and the similar pulse width modulation to the foregoing is performed string by string, before the synchronized synthesis among them is performed. Furthermore in the present invention, the multiplexer and table reference circuits, which function as distributing means, will not necessarily limited to the circuitry which is incorporated in the laser controller. Part of those circuits may be configured as a sole unit. In addition, the table reference performed in obtaining the start and end positions of each pulse will not be a definitive list, and instead of this, those bits of positional information can be computed pixel by pixel. In this way, it is possible for the person skilled in the art to modify the configurations stated in the embodiment.

What is claimed is:

1. A light beam scanning apparatus comprising:
   a light generator generating a scanning light beam;
   a driver driving the light generator depending on a drive signal to be provided;
   a distribution circuit distributing data formed of image information at each pixel of each line along a main scan direction of an image to be targeted, into a plurality of channels of data consisting of a plurality of strings of data;

a modulating-information producing circuit producing information indicating start and end of modulation for each pixel provided by each string of data distributed by the distribution circuit;

a modulation circuit applying the modulation to the data at each pixel belonging to each string of data distributed, by using the start information and the end information produced by the modulating-information producing circuit, whereby a modulated signal is outputted string by string;

a synchronization circuit mutually synchronizing the modulated signals from the plurality of strings of data outputted from the modulation circuit; and a synthesis circuit synthesizing the modulated signals from the plurality of strings of data so as to produce the drive signal, the modulated signals being mutually synchronized by the synchronization circuit, wherein the modulating-information producing circuit is a circuit specifying, of a predetermined number of timings within each pixel and produced by dividing each pixel with a given clock, an arbitrary timing as a start position and a further arbitrary timing as an end position, the start position and the end position corresponding to the start information and the end information for the modulation, respectively.

2. The light beam scanning apparatus according to claim 1, wherein the distribution circuit is configured to distribute the data formed of image information at each pixel of each line into two channels of data consisting of two strings of data, and the modulation circuit is provided with two modulators each performing the modulation every string of data.

3. The light beam scanning apparatus according to claim 2, wherein the modulation is pulse width modulation and the modulators are pulse width modulators.

4. The light beam scanning apparatus according to claim 2, wherein the modulating-information producing circuit is provided with a conversion table for converting the data outputted from the distribution circuit into data indicative of the start position and the end position and means for reading the data indicative of the start position and the end position depending on the data from the distribution circuit by making reference to the conversion table.

5. The light beam scanning apparatus according to claim 1, wherein the modulating-information producing circuit is provided with a conversion table for converting the data outputted from the distribution circuit into data indicative of the start position and the end position and means for reading the data indicative of the start position and the end position depending on the data from the distribution circuit by making reference to the conversion table.

6. A light beam scanning apparatus comprising:

light generating means for generating a scanning light beam;

driving means for driving the light generator depending on a drive signal to be provided;

distributing mean for distributing data formed of image information at each pixel of each line along a main scan direction of an image to be targeted, into a plurality of channels of data consisting of a plurality of strings of data;

modulating-information producing means for producing information indicating start and end of modulation for each pixel provided by each string of data distributed by the distributing means;

modulating means for applying the modulation to the data at each pixel belonging to each string of data distributed, by using the start information and the end information produced by the modulating-information producing means, whereby a modulated signal is outputted string by string;

synchronizing means for mutually synchronizing the modulated signals from the plurality of strings of data outputted from the modulating means; and synthesizing means for synthesizing the modulated signals from the plurality of strings of data so as to produce the drive signal, the modulated signals being mutually synchronized by the synchronizing means, wherein the modulating-information producing means is means for specifying, of a predetermined number of timings within each pixel and produced by dividing each pixel with a given clock, an arbitrary timing as a start position and a further arbitrary timing as an end position, the start position and the end position corresponding to the start information and the end information for the modulation, respectively.

7. An image forming apparatus comprising:

a light generator generating a scanning light beam;

a driver driving the light generator depending on a drive signal to be provided;

a distribution circuit distributing data formed of image information at each pixel of each line along a main scan direction of an image to be targeted, into a plurality of channels of data consisting of a plurality of strings of data;

a modulating-information producing circuit producing information indicating start and end of modulation for each pixel provided by each string of data distributed by the distribution circuit;

a modulation circuit applying the modulation to the data at each pixel belonging to each string of data distributed, by using the start information and the end information produced by the modulating-information producing circuit, whereby a modulated signal is outputted string by string;

a synchronization circuit mutually synchronizing the modulated signals from the plurality of strings of data outputted from the modulation circuit; and a synthesis circuit synthesizing the modulated signals from the plurality of strings of data so as to produce the drive signal, the modulated signals being mutually synchronized by the synchronization circuit, wherein the modulating-information producing circuit is a circuit specifying, of a predetermined number of timings within each pixel and produced by dividing each pixel with a given clock, an arbitrary timing as a start position and a further arbitrary timing as an end position, the start position and the end position corresponding to the start information and the end information for the modulation, respectively.

8. The image forming apparatus according to claim 7, wherein the modulating-information producing circuit is provided with a conversion table for converting the data outputted from the distribution circuit into data indicative of the start position and the end position and means for reading the data indicative of the start position and the end position depending on the data from the distribution circuit by making reference to the conversion table.

* * * * *